United States Patent
Ohmatsu

(10) Patent No.: US 7,149,560 B2
(45) Date of Patent: Dec. 12, 2006

(54) SUPERCONDUCTING CABLE AND SUPERCONDUCTING CABLE LINE

(75) Inventor: Kazuya Ohmatsu, Osaka (JP)

(73) Assignee: Sumitomo Electric Industries, Ldt., Osaka (JP)

(*) Notice: Subject to any disclaimer, the term of this patent is extended or adjusted under 35 U.S.C. 154(b) by 371 days.

(21) Appl. No.: 10/470,418

(22) PCT Filed: Oct. 10, 2002

(86) PCT No.: PCT/JP02/10562

§ 371 (c)(1),
(2), (4) Date: Jul. 29, 2003

(87) PCT Pub. No.: WO03/038840

PCT Pub. Date: May 8, 2003

(65) Prior Publication Data

US 2004/0058822 A1    Mar. 25, 2004

(30) Foreign Application Priority Data

Nov. 2, 2001  (JP) .............................. 2001-338470

(51) Int. Cl.
  *H01B 12/00* (2006.01)
  *H01F 6/00* (2006.01)
  *H01L 39/00* (2006.01)
(52) U.S. Cl. ............... 505/230; 505/237; 174/125.1
(58) Field of Classification Search ......... 505/230, 505/237, 238
  See application file for complete search history.

(56) References Cited

U.S. PATENT DOCUMENTS

| | | | |
|---|---|---|---|
| 4,184,042 A * | 1/1980 | Vulis et al. ............... | 174/15.5 |
| 4,932,523 A * | 6/1990 | Yamazoe ............... | 206/315.6 |
| 4,961,066 A * | 10/1990 | Bergsjo et al. ........... | 338/325 |
| 5,140,290 A | 8/1992 | Dersch | |
| 5,859,386 A * | 1/1999 | Herrmann et al. ......... | 174/15.5 |
| 5,932,523 A * | 8/1999 | Fujikami et al. ........... | 505/231 |
| 6,137,388 A * | 10/2000 | Saravolac ................... | 505/211 |
| 6,440,211 B1 * | 8/2002 | Beach et al. .................... | 117/9 |
| 6,555,256 B1 * | 4/2003 | Christen et al. ............ | 428/697 |
| 6,596,945 B1 * | 7/2003 | Hughey et al. .......... | 174/125.1 |

(Continued)

FOREIGN PATENT DOCUMENTS

EP          0650205 A1 *    4/1995

(Continued)

OTHER PUBLICATIONS

Alford et al. "High temperature superconducting thick films", Supercond. Sci. Technol. 10 (1997), pp. 169-185.*

(Continued)

*Primary Examiner*—Colleen P. Cooke
(74) *Attorney, Agent, or Firm*—Foley & Lardner LLP

(57) ABSTRACT

A superconducting cable includes a first conductor layer formed of superconducting wires, and an insulating layer formed at the outer periphery of the first conductor layer. The first conductor layer is an assembly of a plurality of superconducting wires obtained by forming an RE based superconductor layer on a metal substrate. The current is limited by an electrical resistance generated when the current of the first conductor layer exceeds the critical current, thereby preventing the superconducting cable from being damaged. A superconducting cable line is formed of a base and a current limiter, which is formed by using the above-described superconducting cable. Accordingly, when a current exceeding the rated current of the base flows, it can be damped.

19 Claims, 1 Drawing Sheet

U.S. PATENT DOCUMENTS

| | | | |
|---|---|---|---|
| 6,610,632 B1 * | 8/2003 | Honjo et al. | 505/237 |
| 6,716,795 B1 * | 4/2004 | Norton et al. | 505/238 |
| 6,745,059 B1 * | 6/2004 | Buczek et al. | 505/230 |
| 6,812,191 B1 * | 11/2004 | Park et al. | 505/121 |
| 6,849,580 B1 * | 2/2005 | Norton et al. | 505/237 |
| 6,864,430 B1 * | 3/2005 | Hughey et al. | 174/125.1 |
| 6,943,656 B1 * | 9/2005 | Buczek et al. | 335/216 |

FOREIGN PATENT DOCUMENTS

| | | | |
|---|---|---|---|
| EP | 1174887 A2 * | 1/2002 | |
| JP | 64-089130 A | 4/1989 | |
| JP | 01-161614 A | 6/1989 | |
| JP | 02-105402 A | 4/1990 | |
| JP | 06-053037 A | 2/1994 | |
| JP | 06-243737 A | 9/1994 | |
| JP | 2001-006837 A | 1/2001 | |
| WO | WO 00/70631 | * | 11/2000 |
| WO | WO 01/33578 A1 | * | 5/2001 |
| WO | WO 01/33579 A1 | * | 5/2001 |
| WO | WO 02/15203 A1 | * | 2/2002 |
| WO | WO 02/29930 A2 | * | 5/2002 |

OTHER PUBLICATIONS

Perkins et al. "Scanning potentiometry and magnetic imaging of current transport in high-temperature superconductor coated conductors" Supercond. Sci. Technol. 14 (2001), pp. 685-689.*

Marsh, George "Time ripe for superconductivity?" Materials Today, Apr. 2002, pp. 46-50.*

* cited by examiner

SUPERCONDUCTING CABLE AND SUPERCONDUCTING CABLE LINE

TECHNICAL FIELD

The present invention relates to superconducting cables and superconducting cable lines using the cables. More particularly, the invention relates to a high temperature superconducting cable that can be prevented from being damaged even with the occurrence of an anomalous current, such as a short-circuit current, and also relates to a superconducting cable line using such a cable.

BACKGROUND ART

It is expected that high temperature superconducting cables will be used for supplying a large volume of electricity. Particularly in urban areas having a restricted space, it is difficult to ensure routes (which are referred to as "duct lines") for laying new cables. Even if this is physically possible, enormous infrastructural cost in terms of construction would be required, which makes such cable laying infeasible.

In order to solve this problem, high temperature superconducting cables having a small size almost equal to the size of known crosslinked polyethylene (XLPE) cables and which are capable of supplying the amount of current several times greater than the known XLPE cables are being developed. In a prototype of cable system made in the past, a three-phase core high temperature superconducting cable having a multiple layers of Bi based superconducting silver sheathed tape wires wound around a former, an insulating layer and a shielding layer is inserted into a long piece of thermal insulation tube, into which a cooling medium, such as liquid nitrogen, is supplied.

Measures against a short-circuit current caused by thunderstorms or disasters have been taken for XLPE cables designed to be placed underground. In practice, such measures against a short-circuit current are also essential for high temperature superconducting cables. Thus far, the following techniques have been considered: ① a technique for causing a short-circuit current to flow into a copper former; and ② a technique for making the flowing current capacity of the cable cores much greater than that during normal operations so that high temperature superconducting cable cores are prevented from being damaged in the occurrence of a shirt-circuit current. Additionally, ③ a technique for inhibiting a short-circuit current and also for protecting a high temperature superconducting cable by connecting a superconducting apparatus called "current limiter" to the cable is also considered.

However, the technique for shunting a short-circuit current with the former results in an increased cross sectional area of the former, and thus, a small size, which is unique to the high temperature superconducting cables, is impaired.

The technique for making the flowing current capacity of a high temperature superconducting cable core much greater than that during normal operations, results in increased cost of the cables.

The development of current limiter is at the fledgling stage of consideration, and there are various problems to be solved in terms of the system and materials for the development of its high voltage system that can be applied to a cable system of 66 kV, or higher 275 kV.

DISCLOSURE OF INVENTION

Accordingly, it is the main object of the present invention to provide a superconducting cable having a current limiting function of damping the current by generating an electrical resistance when the current of a superconductor exceeds the critical current, and also to provide a superconducting cable line using such a cable.

In the present invention, the above-described object can be achieved by using an RE (rare earth element) based superconducting wire that can exhibit high electrical resistance when it is quenched.

A superconducting cable according to the present invention includes a first conductor layer formed of a plurality of superconducting wires, and an insulating layer formed at the outer periphery of the first conductor layer, the superconducting wires being made by forming an RE based superconductor layer on a metal substrate.

In the present invention, the use of an RE based superconducting wire that can increase an electrical resistance in a superconducting-normal state transition enables the superconducting wire to have high resistance when a short-circuit current is generated, thereby restricting the amount of current and protecting the cable from being damaged.

The superconducting cable of the present invention is basically configured such that it sequentially includes a former, a first conductor layer, and an insulating layer from the inner side to the outer side. A second conductor layer and a protective layer may also be sequentially disposed at the outer periphery of the insulating layer. The superconducting cable having the above configuration is similar to a multilayer type cable using a Bi based superconducting silver sheathed tape wires. Accordingly, the increase in applied voltage of the superconducting cable and the connection with a Bi based multilayer type superconducting cable can be easily achieved.

Preferably, the first conductor layer may be used for a normal current supply, and the second conductor layer may be used as a shielding layer.

An RE-based superconductor is used as the superconductor for the first and second conductor layers. RE (rare earth element) includes Y, Nd, Sm, Pr, Ho, Eu, Gd, etc., and more specifically, $YBa_2Cu_3O_x$, $Y_2BaCuO_x$, $NdBa_2Cu_3O_x$, $Nd_4Ba_2Cu_2O_x$, $SmBa_2Cu_3O_x$, $Sm_2BaCuO_x$, $PrBa_2Cu_3O_x$, $Pr_2BaCuO_x$, $HoBa_2Cu_3O_x$ and the like.

A superconducting tape wire obtained by forming an RE based superconductor layer on a metal substrate is suitably used as the RE based superconducting wire. A stainless metal may be used as the metal substrate. The formation of an RE based superconductor layer is performed by chemical vapor deposition (CVD) or physical vapor deposition (PVD). An intermediate layer may be disposed between the metal substrate and the RE based superconductor layer. Yttria stabilized zirconia (YSZ) is suitably used as the material of the intermediate layer.

The first conductor layer is helically wound around or attached parallel to the former. The second conductor layer is also helically wound around or attached parallel to the insulating layer. The first and second layers may each be formed of multiple layers. In this case, preferably, a plurality of superconductor layers is non-inductively wound so that the self-inductance becomes small. The self-inductance can be decreased, for example, by adjusting the helicoidal pitch of the superconducting wire or by alternately reversing the winding direction of the layers.

A superconducting cable line of the present invention includes a base and a current limiter for damping a current which exceeds a rated current of the base. The current limiter is formed of the above-described superconducting cable of the present invention.

Thus, by dividing the superconducting cable line into the base and the current limiter, and using the superconducting cable of the present invention as the current limiter, it is possible to achieve a cable line provided with a current limiting function for damping a short-circuit current by means of a short RE based superconducting wire.

It is sufficient if the current limiter has a length that can generate a resistance and an inductance required for inhibiting a short-circuit current. Accordingly, if a long conductor is used as the base, and a short conductor is used as the current limiter, it is possible to achieve a superconducting cable line provided with a current limiter for inhibiting a short-circuit current by using a currently used short RE based superconducting wire having a length of 1 m to a maximum of 10 m. The current limiter may be disposed at a terminal or an intermediate connecting portion of the base.

The superconducting cable used for the base may preferably be formed of a superconductor different from an RE based superconductor. As the superconductor other than the RE based superconductor, a Bi—Sr—Ca—O type, a Bi—Pb—Sr—Ca—O type, a Tl—Ba—Ca—Cu—O type, or a Tl—Pb—Sr—Ca—Cu—O type may be used, and more preferably, a Bi—Sr—Cu—O type or a Bi—Pb—Sr—Cu—O type may be used.

For example, by connecting the RE based superconducting cable of the present invention to part of a terminal of a high temperature superconducting cable using a long Bi based superconducting silver sheathed tape wire having a length on the order of kilometers, a large high temperature superconducting cable system can be manufactured. Measures to increase the applied voltage, which are one of the major problems in the present current limiters, can easily be taken since the configuration of the current limiter is the same as the cable. Accordingly, the current limiter used in the 66 kV cable system can easily be formed into a system.

BEST MODE FOR CARRYING OUT THE INVENTION

Figure 1:
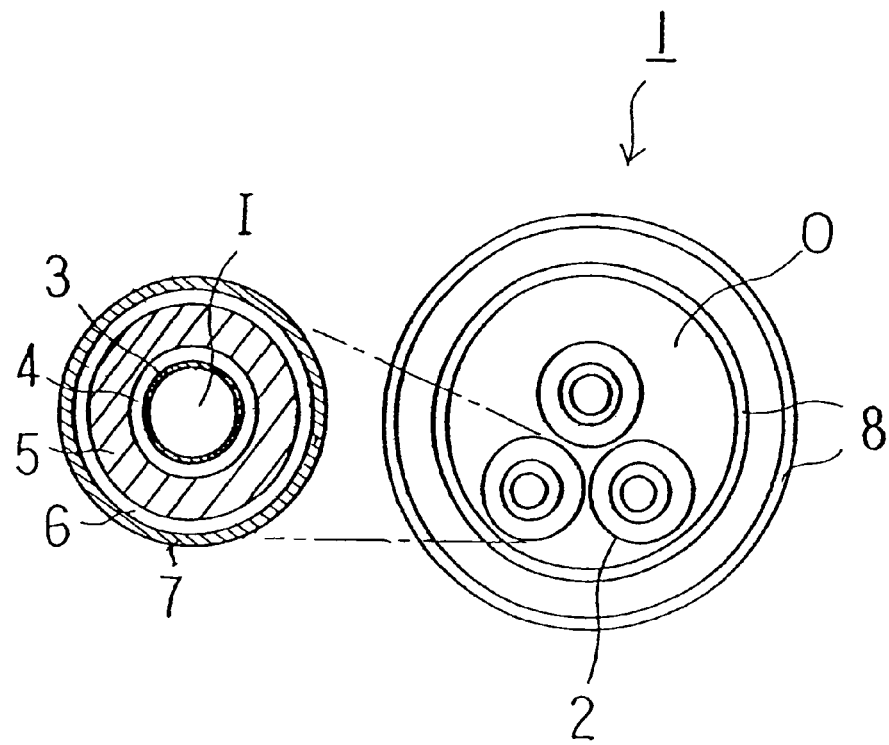
FIG. 1 is a cross sectional view illustrating a superconducting cable according to the present invention.

Embodiments of the present invention are described below.
(First Embodiment)
The configuration of a superconducting cable of the present invention is described below with reference to FIG. 1.
(Overall Configuration)
A superconducting cable 1 of the present invention is configured such that cable cores 2 are housed in a thermal insulation tube 8. Each cable core 2 includes, from the inner side to the outer side, a former 3, a first conductor layer 4, and an insulating layer 5. A second conductor layer 6 and a protective layer 7 may also be sequentially disposed around the external periphery of the insulating layer 5. While a three-phase core high temperature superconducting cable is used in this embodiment, a single-core cable may be used.
(Former)
An aluminum, copper, or stainless pipe is used for the former 3, which is the innermost portion of the cable core 2. Alternatively, considering the mechanical characteristic of the cable, a strand of metal lines, such as narrow copper lines, may be employed. If the pipe is used, the internal portion I of the former can be used as a cooling medium path. If narrow copper lines are used, each copper line is preferably coated with an insulating material for reducing the eddy current loss.
(First and Second Conductor Layers)
An RE superconductor is used as the superconductor for the first and second conductor layers 4 and 6, respectively. A tape-shaped superconductor obtained by forming an RE superconductor layer on a metal substrate is suitable as the superconductor wire. The first conductor layer is formed by being helically wound around or being attached parallel to the former. The second conductor layer is formed by being helically wound around or being attached parallel to the insulating layer. In this embodiment, the first conductor layer 4 is used as a cable conductor, and the second conductor layer 6 is used as a shielding layer. The protective layer 7 may also be disposed on the second conductor layer 6.
(Insulating Layer)
The insulating layer 5 is configured such that a cooling medium is soaked in a wound insulating material. The insulating material includes insulating paper, such as kraft paper, semi-synthetic paper, such as Polypropylene Laminated Paper (PPLP), formed by laminating kraft paper at least to one side of a polypropylene film, and synthetic paper, such as a polyethylen film or a polypropylene film. Liquid helium or liquid nitrogen is used as the cooling medium.
(Thermal Insulation Tube)
The thermal insulation tube 8 may be configured in any manner provided that a sufficient thermal insulation property is exhibited. Generally, however, a double structure formed of a corrugated inner tube and outer tube is employed. A thermal insulating material, such as super insulation, is disposed between the inner tube and the outer tube and the space therebetween is kept in a vacuum state so as to form an insulating layer. A space O formed between the thermal insulation tube 8 and each core 2 serves as a cooling medium path.
(Protection Layer)
A protection layer (not shown) may also be formed for protecting the thermal insulation tube 8. For example, polyvinyl chloride (PVC) is coated on the surface of the thermal insulation tube.
(Second Embodiment)
Ten $YBa_2Cu_3O_x$ (YBCO) superconducting tape wires having a width of 5 mm and a thickness of about 0.1 mm were spirally wound at a 300 mm pitch around a stainless pipe having an inner diameter of 20 mm$\phi$, an outer diameter of 24 mm$\phi$, and a length of 2 m, thereby forming a single-layered Y based superconducting cable conductor. The superconducting tape wires were configured such that a 2 μm-YBCO superconducting layer was formed on a stainless substrate having a width of 5 mm and a thickness of 0.1 mm via a 1 μm-YSZ intermediate layer and the surface thereof was sheathed with 5 μm silver, and the critical current thereof in liquid nitrogen was about 40 A. The layers within the range of 30 cm from the respective terminals of the superconducting cable were integrated by soldering with a copper lead wire attached thereto for causing a current to flow.

A DC current-carrying test was conducted by soaking this conductor in liquid nitrogen. The critical current defined by the generation of an electric resistance with a criterion of 1 μV/cm was 400 A.

As a comparative example, ten Bi based superconducting silver sheathed tape wires having a width of 4 mm and a thickness of about 0.3 mm were spirally wound at a 300 mm pitch around a stainless pipe having a configuration similar to that used in the second embodiment, thereby forming a single-layered Bi based superconducting cable conductor. The Bi based superconducting silver sheathed tape wires were configured such that 61 $Bi_2Sr_2Ca_2Cu_3O_x$ superconducting layers having a width of about 30 μm were embedded in a silver matrix having a width of 4 mm and a thickness of about 0.3 mm, and the critical current thereof in liquid nitrogen was about 50 A. The layers within the range of 30 cm from the respective terminals of the superconducting cable conductor were integrated by soldering with a copper lead wire attached thereto for causing a current to flow.

A DC current-carrying test was conducted by soaking this conductor in liquid nitrogen. The critical current defined by the generation of an electric resistance with a criterion with 1 μV/cm was 500 A.

The current-voltage (I–V) characteristic was measured by separately connecting the two conductors of this embodiment and the comparative example to an AC power source, and by supplying the AC up to ten times higher than the critical current to the conductors. The results are as follows. In the Y based superconducting cable conductor of this embodiment, when the AC reached 1000 A, the current was suppressed by the generation of an electric current by the quenching of the conductor, and a current of 1500 A or higher did not flow in the conductor. That is, the implementation of a current limiting function was observed. In contrast, in the Bi based superconducting cable conductor of the comparative example, because of a low resistance of silver, which served as a matrix of the superconducting tape wires, the flow of AC current was observed in the conductor even at 5000 A. That is, the current inhibiting effect (current limiting function) was not observed.

(Third Embodiment)

Twenty $HoBa_2Cu_3O_x$ (HoBCO) superconducting tape wires having a width of 5 mm and a thickness of about 0.1 mm were spirally wound at a 400 mm pitch around a copper pipe having an inner diameter of 26 mmφ, an outer diameter of 30 mmφ, and a length of 1 m, and thereby two layers of HoBCO superconducting cable conductors were formed. The HoBCO superconducting tape wires were configured such that a 3 μm-HoBCO superconducting layer was formed on a stainless substrate having a width of 5 mm and a thickness of 0.1 mm via a 1 μm-YSZ intermediate layer and the surface of the layer was sheathed with 5 μm silver, and their critical current in liquid nitrogen was about 50 A. An insulating layer having a thickness of 5 mm was formed between the first and second layers by wrapping, in half-overlap, 10 layers of kraft paper having a thickness of 0.2 mm. The first and second layers were wound in opposite directions. The layers within the range of 30 cm from the respective terminals of the superconducting cable conductor were integrated by soldering with a copper lead wire attached thereto for causing a current to flow.

A DC current-carrying test was conducted by soaking this conductor in liquid nitrogen, and the critical current defined by the generation of an electric resistance with a criterion of 1 μV/cm was 1000 A for both the first and second layers.

Ten Bi based superconducting silver sheathed tape wires having a width of 4 mm and a thickness of about 0.3 mm (in which 61 Bi2223 superconducting layers having a width of about 30 μm were embedded in a silver matrix having a width of 4 mm and a thickness of 0.3 mm, and the critical current in liquid nitrogen was about 50 A) were spirally wound at a 300 mm pitch around a stainless corrugated pipe having an inner diameter of 26 mmφ, an outer diameter of 30 mmφ, and a length of 1 m, and thereby a first layer of Bi based superconducting cable conductor was formed. An insulating layer having a thickness of 5 mm was formed by wrapping, in half-overlap, ten layers of kraft paper having a thickness of 0.2 mm between the first and second layers, the second conductor layer being formed in the same configuration as the first layer except that their winding pitch was in opposite directions each other. The layers within the range of 30 cm from the terminals of the superconducting cable conductor were integrated by soldering with a copper lead wire attached thereto for causing a current to flow.

A DC current-carrying test was conducted by soaking this conductor in liquid nitrogen, and the critical current defined by the generation of an electrical resistance with a criterion of 1 μV/cm was 1000 A for both the first and second layers.

The current-voltage (I–V) characteristic was measured by separately connecting the two conductors to an AC power source, and by supplying the AC up to five times higher than the critical current to the conductors. The results are as follows. In the Ho based superconducting cable conductor of this embodiment, when the AC reached 1000 A, the current was suppressed by the generation of an electric current by the quenching of the conductor, and the current of 1500 A or higher did not flow in the conductor. That is, the implementation of a current limiting function was observed. In contrast, in the Bi based superconducting cable conductor of the comparative example, because of a low resistance of silver, which served as a matrix of the superconducting tape wires, there was the flow of AC current observed even at 5000 A, and the current inhibiting effect (current limiting function) was not recognized. Moreover, the Bi based superconducting cable conductor was partially damaged due to a temperature increase of the conductor.

(Fourth Embodiment)

Figure 2:
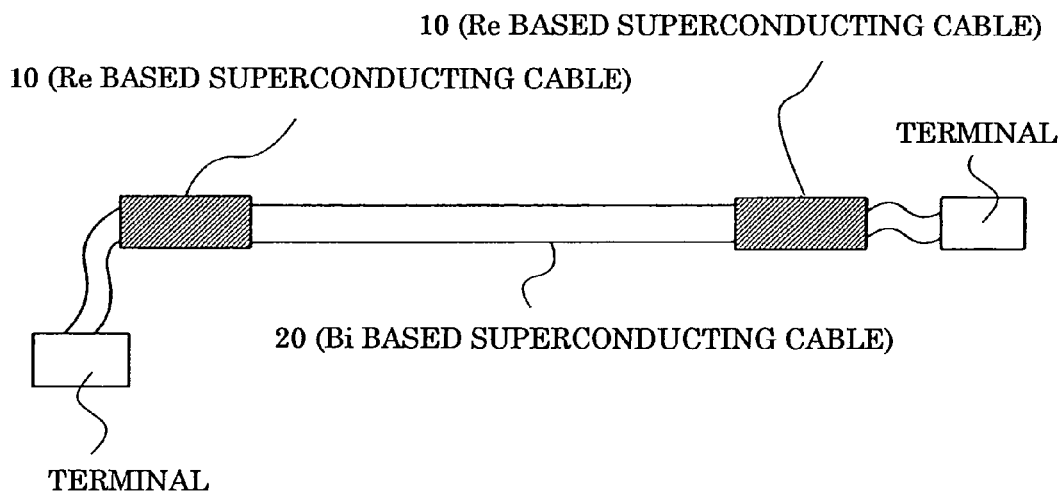
FIG. 2 is a schematic diagram illustrating a superconducting cable line according to the present invention.

As shown in FIG. 2, two 1 m-length RE based superconducting cables (current limiters) 10 described in the third embodiment and one 10 m-length Bi based superconducting cable (base) 20 described in the third embodiment were prepared, and the RE based superconducting cables were disposed at the two ends of the Bi based superconducting cable. The first layer was configured by the connection of the cables such that a conductor current flows, and the second layer was configured by the connection of the cables such that a shield current flows.

An AC up to 5000 A at a frequency of 50 Hz was supplied to this composite cable at an increased ratio of 100 A/minute. When the AC reached 1000 A or more, the current was suppressed by the generation of electrical resistance caused by the quenching of the RE based superconducting cables, and the current of 1500 A or higher did not flow in the conductors. That is, the implementation of a current limiting function was observed. Also, a temperature increase or damage of the cable was not observed in the Bi based superconducting cable, and it was confirmed that the repeated supply of current was possible. Thus, it was confirmed that a fail-safe function implemented by the RE based superconducting cables was exhibited.

INDUSTRIAL APPLICABILITY

As is seen from the foregoing description, according to the superconducting cable of the present invention, an RE based superconducting wire is used, and thus, a fail-safe current limiting function is implemented by generating an electrical resistance when the current of a conductor layer exceeds the critical current, thereby preventing the cable from being damaged.

Additionally, a cable line having a base and a current limiter using the cable of the present invention is enabled to have automatic damping of current when a current higher than the rated current of the base flows.

The invention claimed is:

1. A superconducting cable line comprising:
   a base having a rated current; and
   at least one current limiter for damping a current that exceeds the rated current of the base;
   wherein said at least one current limiter comprises a superconducting cable having a core that comprises a first conductor layer formed of superconducting wires, and an insulating layer formed on the outer periphery of said first, conductor layer, wherein said first conductor layer comprises an assembly of a plurality of superconducting wires made by forming an RE based superconductor layer on a metal substrate; and wherein said RE based superconducting layer limits current by providing an electrical resistance of 1 μV/cm, or higher when a current of the superconducting cable line exceeds the rated current of the base.

2. A superconducting cable line according to claim 1, wherein said at least one current limiter further comprises a second conductor layer provided on the outer periphery of said insulating layer, wherein said second conductor layer comprises an assembly of a plurality of superconducting wires made by forming an RE based superconductor layer on a metal substrate.

3. A superconducting cable line according to claim 2, wherein said first conductor layer is a cable conductor layer, and said second conductor layer is a cable shielding layer.

4. A superconducting cable line according to claim 1, further comprising an intermediate layer between the metal substrate and the RE based superconducting layer.

5. A superconducting cable line according to claim 1, wherein the current limiter is provided at a terminal or an intermediate connecting portion of said base.

6. A superconducting cable line according to claim 1, wherein the superconducting wire of said base is formed of a superconductor different from an RE based superconductor.

7. A superconducting cable line comprising:
   a base; and
   at least one current limiter for damping a current in the base that exceeds a specified current threshold;
   wherein said at least one current limiter comprises a superconducting cable having a cable core housed in a thermal insulation tube, said cable core comprising: a first conductor layer disposed on the outer periphery of a former, said first conductor layer comprising an assembly of a plurality of superconducting wires obtained by forming an RE based superconducting layer on a metal substrate; an insulating layer disposed on the outer periphery of said first conductor laye; a second conductor layer disposed on the outer periphery of said insulating layer, said second conductor layer comprising an assembly of a plurality of superconducting wires obtained by forming an RE superconducting layer on a metal substrate; and a protective layer disposed on the outer periphery of said second conductor layer; and
   wherein said RE based superconducting layer of at least one of the first or second conductor layers limits current by providing an electrical resistance of 1 μV/cm, or higher when a current of the superconducting cable line exceeds a specified current threshold.

8. A superconducting cable line according to claim 7, wherein at least one of the first and second conductor layer further comprises an intermediate layer between the metal substrate and the RE based superconducting layer.

9. A superconducting cable line according to claim 7, wherein the current limiter is provided at a terminal or an intermediate connecting portion of said base.

10. A superconducting cable line according to claim 7, wherein the base comprises a superconducting wire formed of a superconductor different from an RE based superconductor.

11. A superconducting cable line according to claim 7, wherein the base comprises a cable having a length dimension and wherein said at least one current limiter comprises a current limiter disposed on one end of the length dimension of the base cable.

12. A superconducting cable line according to claim 11, further comprising a terminal electrically coupled to said at least one current limiter, wherein said at least one current limiter is disposed between said base cable and said terminal.

13. A superconducting cable line according to claim 7, wherein the base comprises a cable having a length dimension defining a first base cable end and a second base cable end and wherein said at least one current limiter comprises a first current limiter coupled to the first end of the base cable and a second current limiter coupled to the second end of the base cable.

14. A superconducting cable line according to claim 7, wherein said at least one current limiter comprises two current limiters and wherein said base is disposed between the two current limiters.

15. A superconducting cable line according to claim 14, further comprising a terminal electrically coupled to each of said current limiters, wherein each of said current limiters is disposed between said base cable and one of said terminals.

16. A superconducting cable line comprising:
   a base cable; and
   at least one current limiter for damping a current in the base cable that exceeds a specified current threshold;
   wherein said at least one current limiter includes a superconducting cable having a first conductor layer composed of a plurality of superconducting wires comprising an RE based superconductor layer on a metal substrate; and wherein said RE based superconducting layer limits current by providing an electrical resistance of 1 μV/cm, or higher when a current of the superconducting cable line exceeds a specified current threshold.

17. A superconducting cable line according to claim 16, wherein the base cable has a length dimension and wherein said at least one current limiter comprises a current limiter disposed on one end of the length dimension of the base cable.

18. A superconducting cable line according to claim 16, wherein the base cable has a length dimension and two ends and wherein said at least one current limiter comprises a first current limiter disposed on one end of the length dimension of the base cable and a second current limiter disposed on the other end of the length dimension of the base cable.

19. A superconducting cable line according to claim 16, wherein the base cable comprises a superconducting cable formed of a superconductor different from an RE based superconductor.

* * * * *